(12) United States Patent
Hubbard et al.

(10) Patent No.: US 10,725,945 B1
(45) Date of Patent: Jul. 28, 2020

(54) INTEGRATED CIRCUIT WITH COMBINED INTERRUPT AND SERIAL DATA OUTPUT

(71) Applicant: TEXAS INSTRUMENTS INCORPORATED, Dallas, TX (US)

(72) Inventors: Richard Edwin Hubbard, Lavon, TX (US); Richard Sterling Broughton, Dallas, TX (US); Vijayalakshmi Devarajan, Plano, TX (US); Mark Edward Wentroble, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/289,845

(22) Filed: Mar. 1, 2019

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01)

(58) Field of Classification Search
CPC ..... G06F 13/24; G06F 3/4282; G06F 13/4282
See application file for complete search history.

(56) References Cited

U.S. PATENT DOCUMENTS

| | | | | |
|---|---|---|---|---|
| 6,496,880 B1* | 12/2002 | Ma | ............................. | G06F 1/22 709/208 |
| 9,676,357 B2* | 6/2017 | Dittfeld | ............... | B60R 21/0173 |
| 10,298,028 B1* | 5/2019 | Venkatasamy | ............. | H02J 7/00 |
| 10,496,562 B1* | 12/2019 | Graif | ...................... | G06F 13/364 |
| 2009/0030535 A1* | 1/2009 | Yang | ......................... | G06F 3/16 700/94 |
| 2015/0199287 A1* | 7/2015 | Sengoku | .................. | G06F 13/24 710/110 |
| 2015/0350772 A1* | 12/2015 | Oliaei | ....................... | H04R 1/04 381/111 |
| 2016/0192084 A1* | 6/2016 | Oliaei | ................... | H04R 19/005 367/135 |
| 2018/0285292 A1* | 10/2018 | Amarilio | .................. | G06F 13/24 |
| 2019/0108149 A1* | 4/2019 | Graif | ....................... | G06F 13/24 |

* cited by examiner

*Primary Examiner* — Tim T Vo
*Assistant Examiner* — Phong H Dang
(74) *Attorney, Agent, or Firm* — John R. Pessetto; Charles A. Brill; Frank D. Cimino

(57) ABSTRACT

An integrated circuit includes a combined serial data output and interrupt output terminal, a serial communication control circuit; an interrupt generation circuit, and an output circuit. The output circuit includes a serial data input, an interrupt input, and a combined serial data and interrupt output. The serial data input is coupled to a serial data output of the serial communication circuit. The interrupt input is coupled to an interrupt output of the interrupt generation circuit. The combined serial data and interrupt output is coupled to the combined serial data output and interrupt output terminal.

13 Claims, 3 Drawing Sheets

US 10,725,945 B1

INTEGRATED CIRCUIT WITH COMBINED INTERRUPT AND SERIAL DATA OUTPUT

BACKGROUND

In an integrated circuit, components forming an electronic circuit are fabricated on a single semiconductor substrate. The number of input/output terminals needed to connect the integrated circuit to external circuitry, is one factor that limits the size of the packaged integrated circuit. For example, the size of the package disposed about the integrated circuit may be determined by the number of conductive pins required to provide interconnections between the integrated circuit and external circuitry. The size of package may be many times the size of the integrated circuit.

SUMMARY

An integrated circuit that provides serial data output and an interrupt via a single terminal is disclosed herein. In one example, an electronic system includes a first integrated circuit and a second integrated circuit. The first integrated circuit includes a serial data input terminal and an interrupt input terminal. The second integrated circuit includes a combined serial data output and interrupt output terminal, a serial communication control circuit, an interrupt generation circuit, and an output circuit. The combined serial data output and interrupt output terminal is coupled to the serial data input terminal of the first integrated circuit and to the interrupt input terminal of the first integrated circuit. The output circuit includes a serial data input, an interrupt input, and a combined serial data and interrupt output. The serial data input is coupled to a serial data output of the serial communication circuit. The interrupt input coupled to an interrupt output of the interrupt generation circuit. The combined serial data and interrupt output is coupled to the combined serial data output and interrupt output terminal.

In another example, an integrated circuit includes a combined serial data output and interrupt output terminal, a serial communication control circuit; an interrupt generation circuit, and an output circuit. The output circuit includes a serial data input, an interrupt input, and a combined serial data and interrupt output. The serial data input is coupled to a serial data output of the serial communication circuit. The interrupt input is coupled to an interrupt output of the interrupt generation circuit. The combined serial data and interrupt output is coupled to the combined serial data output and interrupt output terminal.

In a further example, an integrated circuit includes an output terminal, an input terminal a serial communication control circuit, an interrupt generation circuit, and an output circuit. The output terminal is configured to provide an interrupt output signal and a serial data output signal. The input terminal is configured to receive a select signal that requests serial communication with the integrated circuit. The serial communication control circuit is configured to generate the serial data output signal. The interrupt generation circuit is configured to generate the interrupt output signal. The output circuit is coupled to the output terminal, the serial communication control circuit, and the interrupt generation circuit. The output circuit is configured to provide the serial data output signal to the output terminal responsive to the select signal being active, and to provide the interrupt output signal to the to the output terminal responsive to the select signal being inactive.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to. . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Interrupts are widely used in processor-based systems to trigger service. For example, a peripheral device, such as a communication interface device, is coupled to a processor via a communication bus, and provides an interrupt that triggers service of communication circuitry by the processor. The communication interface device will include a pin dedicated to providing the interrupt signal to the processor. Because the cost of a packaged integrated circuit is a function of the number of pins provided by the package, inclusion of the interrupt pin increases the cost of the packaged integrated circuit. To reduce cost, some implementations of the communication interface device may forgo the interrupt pin and require the processor poll to obtain device status, which wastes processor cycles, and may decrease performance.

The integrated circuits disclosed herein reduce pin count of the packaged integrated circuit while also providing an interrupt signal. The integrated circuits share a single pin for interrupt signal output and serial communication data output. For example, some implementations of the integrated circuits include a serial peripheral interface (SPI) bus for communication with a processor or other SPI bus master, and a single pin of the integrated circuit is used to provide serial data out (SDO) and an interrupt signal for use by the bus master. When the bus master activates a chip select signal, indicating that a serial data transfer is to take place, the shared pin provides serial output data. When the chip select signal is inactive, the shared pin provides an interrupt signal.

Figure 1:
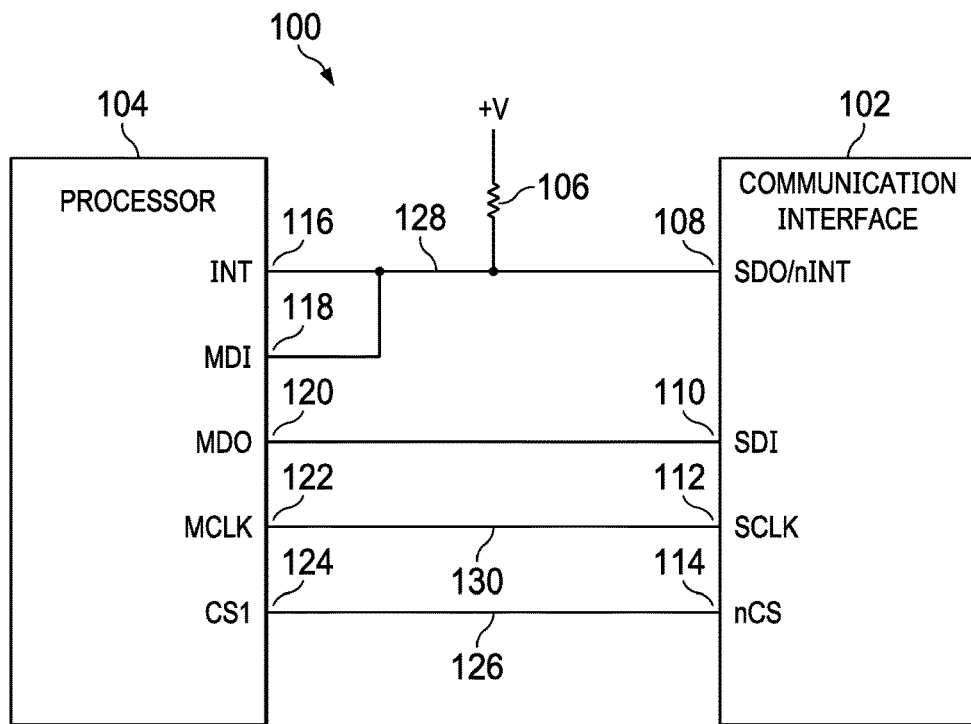
FIG. 1 shows a block diagram for an example electronic system that includes an integrated circuit with a combined interrupt and serial data output terminal in accordance with the present disclosure.

FIG. 1 shows a block diagram for an example electronic system 100 that includes an integrated circuit with a combined interrupt and serial data output terminal in accordance with the present disclosure. The electronic system 100 includes an integrated circuit 102 and an integrated circuit 104. The integrated circuit 104 is a processor, such as a microcontroller, or other device that services interrupts in some implementations of the 100. The integrated circuit 104 includes an interrupt input terminal 116 to receive interrupt signals indicating that a service routine should be executed transmitted by the integrated circuit 102. The integrated circuit 104 includes serial bus master circuitry. For example, an implementation of the integrated circuit 104 includes SPI bus master circuitry. The integrated circuit 104 includes a serial data input terminal 118, a serial data output terminal 120, a serial clock output terminal 122, and a chip select output terminal 124. The serial data input terminal 118 is to receive serial data transmitted by the integrated circuit 102. The serial data output terminal 120 is to provide serial output data to the integrated circuit 102. The serial clock output terminal 122 is to provide a clock signal 130 to control timing of serial data transfer between the integrated circuit 102 and the integrated circuit 104. The chip select output terminal 124 is to provide a chip select signal 126 to enable a transfer of serial data between the integrated circuit 102 and the integrated circuit 104.

The integrated circuit 102 is a communication interface device in some implementations of the electronic system 100. For example, the integrated circuit 102 is a controller area network (CAN) interface through which the integrated circuit 104 communicates other devices via a CAN bus in some implementations of the electronic system 100. The integrated circuit 102 provides other functionality in some implementations of the electronic system 100. The integrated circuit 102 includes serial bus slave circuitry. For example, an implementation of the integrated circuit 102 includes SPI bus slave circuitry. The integrated circuit 102 includes a serial data input terminal 110, a serial clock input terminal 112, a serial communication select input terminal 114, and a combined serial data output and interrupt output terminal 108. The serial data input terminal 110 is coupled to the serial data output terminal 120 of the integrated circuit 104, and is to receive the serial data transmitted by the integrated circuit 104. The serial clock input terminal 112 is coupled to the serial clock output terminal 122 of the integrated circuit 104, and is to receive the serial clock 130 transmitted by the integrated circuit 104. The serial communication select input terminal 114 is coupled to the chip select output terminal 124 of the integrated circuit 104, and is to receive the chip select signal 126 transmitted by the integrated circuit 104.

The combined serial data output and interrupt output terminal 108 is coupled to the interrupt input terminal 116 and the serial data input terminal 118 of the integrated circuit 104. The combined serial data output and interrupt output terminal 108 transmits interrupt signals from the integrated circuit 102 to the integrated circuit 104, and transmits serial data from the integrated circuit 102 to the integrated circuit 104. The electronic system 100 includes a pull-up resistor 106 coupled to the combined serial data output and interrupt output terminal 108, the interrupt input terminal 116, and the serial data input terminal 118. The integrated circuit 102 includes an output circuit that drives the combined serial data output and interrupt output terminal 108. The output circuit selects an interrupt signal or a serial data output signal to drive the combined serial data output and interrupt output terminal 108 based on the state of the chip select signal 130. The combined serial data output and interrupt output terminal 108 in conjunction with output circuit of the integrated circuit 102 allows the pin count of the integrated circuit 102 to be reduced.

Figure 2:
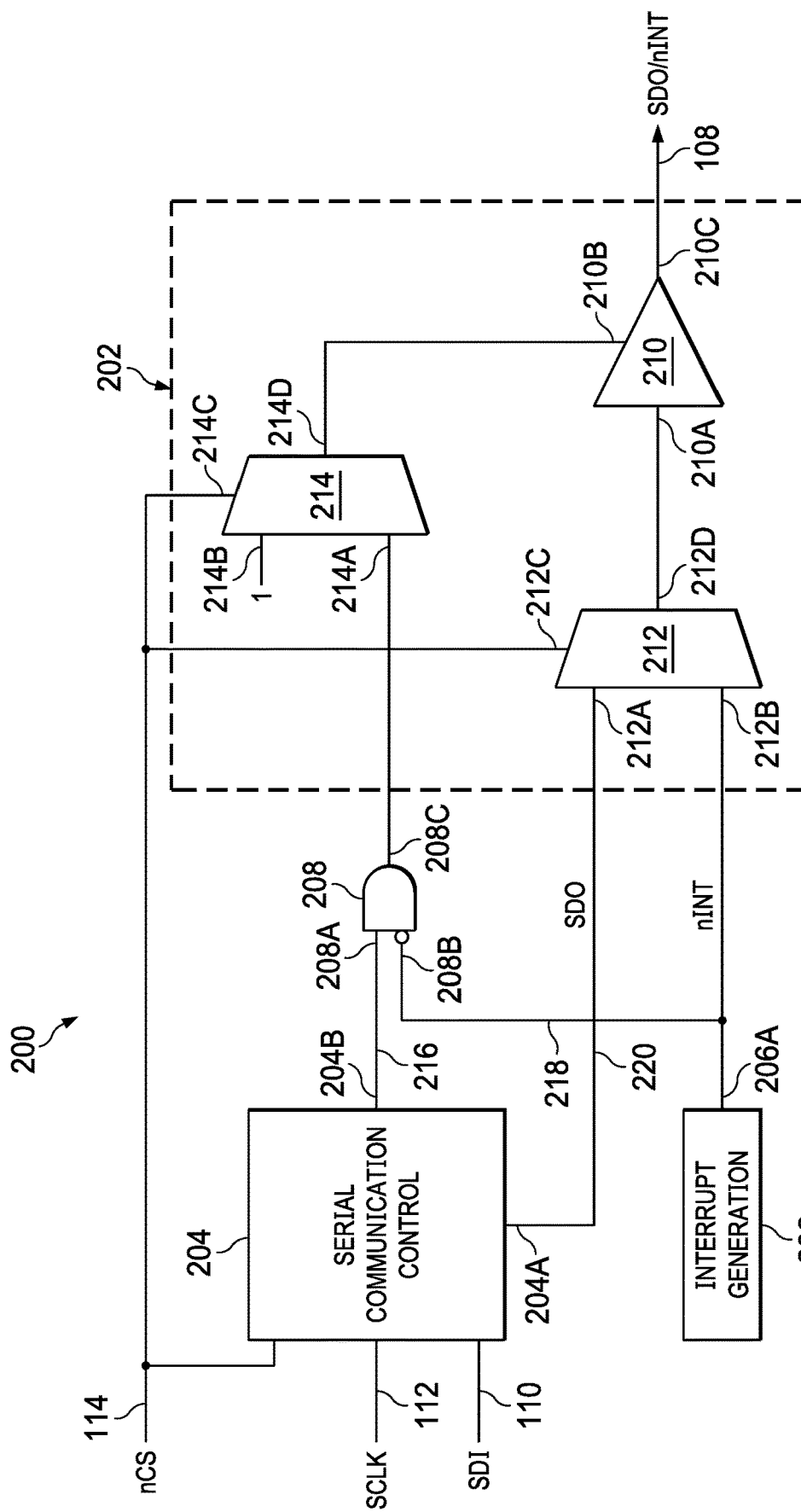
FIG. 2 shows a block diagram for an example integrated circuit that includes a combined interrupt and serial data output terminal in accordance with the present disclosure.

FIG. 2 shows a block diagram for an example integrated circuit 200 that includes a combined serial data output and interrupt output terminal 108 in accordance with the present disclosure. The integrated circuit 200 is an implementation of the integrated circuit 102. The integrated circuit 200 includes an output circuit 202, a serial communication control circuit 204, an interrupt generation circuit 206, and an interrupt enable circuit 208. The output circuit 202 is coupled to the combined serial data output and interrupt output terminal 108. The serial communication control circuit 204 is coupled to the serial data input terminal 110, the serial clock input terminal 112, and serial communication select input terminal 114 and controls transfer of serial data into and out of the integrated circuit 200. More specifically, the serial communication control circuit 204 generates a serial data output signal 220 that is provided to the combined serial data output and interrupt output terminal 108. The serial communication control circuit 204 also generates a transaction envelope signal 216 that defines the time during which no serial data transfer is active. That is, the transaction envelope signal 216 defines the time during which an interrupt output signal 218 is enabled to be driven to the combined serial data output and interrupt output terminal 108. The interrupt generation circuit 206 generates the interrupt output signal 218 that is provided to the combined serial data output and interrupt output terminal 108.

The output circuit 202 is coupled to the serial communication control circuit 204, the interrupt generation circuit 206, the interrupt enable circuit 208, and the combined serial data output and interrupt output terminal 108. The output circuit 202 drives the interrupt output signal 218 generated by the interrupt generation circuit 206 and the serial data generated by the output circuit 202 to the combined serial data output and interrupt output terminal 108. The output circuit 202 includes a serial data input, an interrupt input, an interrupt enable input, and a combined serial data and interrupt output. The serial data input is coupled to a serial data output of the serial communication control circuit 204. The interrupt input is coupled to an interrupt output of the interrupt generation circuit 206. The combined serial data and interrupt output is coupled to the combined serial data output and interrupt output terminal 108.

The output circuit 202 includes a driver circuit 210, a selector circuit 212, and a selector circuit 214. The driver circuit 210 drives the serial output signal and the interrupt output signal 218 to the combined serial data output and interrupt output terminal 108, and includes an output 210C coupled to the combined serial data output and interrupt output terminal 108, a data input 210A, and an enable input 210B. The output 210C serves as the combined serial data and interrupt output of the output circuit 202.

The interrupt enable circuit 208 includes an input 208A, an input 208B, and an output 208C. The interrupt enable circuit 208 controls enabling of the driver circuit 210 based on the transaction envelope signal 216 generated by the serial communication control circuit 204, and the interrupt output signal 218 generated by the interrupt generation circuit 206. For example, an implementation of the interrupt enable circuit 208 activates a signal to enable the driver circuit 210 to drive the interrupt output signal 218 generated by the interrupt generation circuit 206 to the combined serial data output and interrupt output terminal 108 if the transaction envelop signal 216 is inactive and the interrupt output signal 218 is active, otherwise the signal to activate the driver circuit 210 is inactive. The input 208A of the interrupt enable circuit 208 is coupled to the transaction envelope output 204B of the serial communication control circuit 204.

The input 208B of the interrupt enable circuit 208 is coupled to the interrupt output 206A of the interrupt generation circuit 206.

The selector circuit 212 includes an input 212A, an input 212B, an input 212C, and an output 212D. The input 212A serves as the serial data input of the output circuit 202, and the input 212B serves as the interrupt input for the output circuit 202. The selector circuit 212 selects the interrupt output signal 218 generated by the interrupt generation circuit 206 or the serial data output signal 220 generated by the serial communication control circuit 204 to provide to the driver circuit 210. The output 212D of the selector circuit 212 is coupled to the data input 210A of the driver circuit 210. The input 212A of the selector circuit 212 is coupled to the serial data output 204A of the serial communication control circuit 204. The input 212B of the selector circuit 212 is coupled to the interrupt output 206A of the interrupt generation circuit 206. The input 212C of the selector circuit 212 is coupled to the serial communication select input terminal 114. The selector circuit 212 routes the serial data output signal 220 generated by the serial communication control circuit 204 to the driver circuit 210 if the chip select signal 126 received at the serial communication select input terminal 114 is active, and routes the interrupt output signal 218 generated by the interrupt generation circuit 206 to the driver circuit 210 if the chip select signal 126 received at the serial communication select input terminal 114 is inactive.

The selector circuit 214 includes an input 214A, an input 214B, an input 214C, and an output 214D. The selector circuit 214 selects a signal at one of the inputs 214A and 214B to provide as an enable signal to the driver circuit 210. The input 214A of the selector circuit 214 is coupled to the output 208C of the interrupt enable circuit 208. The input 214B of the selector circuit 214 is coupled to a logical "one" voltage. The input 214C of the selector circuit 214 is coupled to the serial communication select input terminal 114. The output 214D of the selector circuit 214 is coupled the enable input 210B of the driver circuit 210. The selector circuit 214 routes the logical "one" voltage at input 214B to the driver circuit 210 if the chip select signal 126 received at the serial communication select input terminal 114 is active, and routes the interrupt enable signal generated by the interrupt enable circuit 208 to the driver circuit 210 if the chip select signal 126 received at the serial communication select input terminal 114 is inactive.

Figure 3:
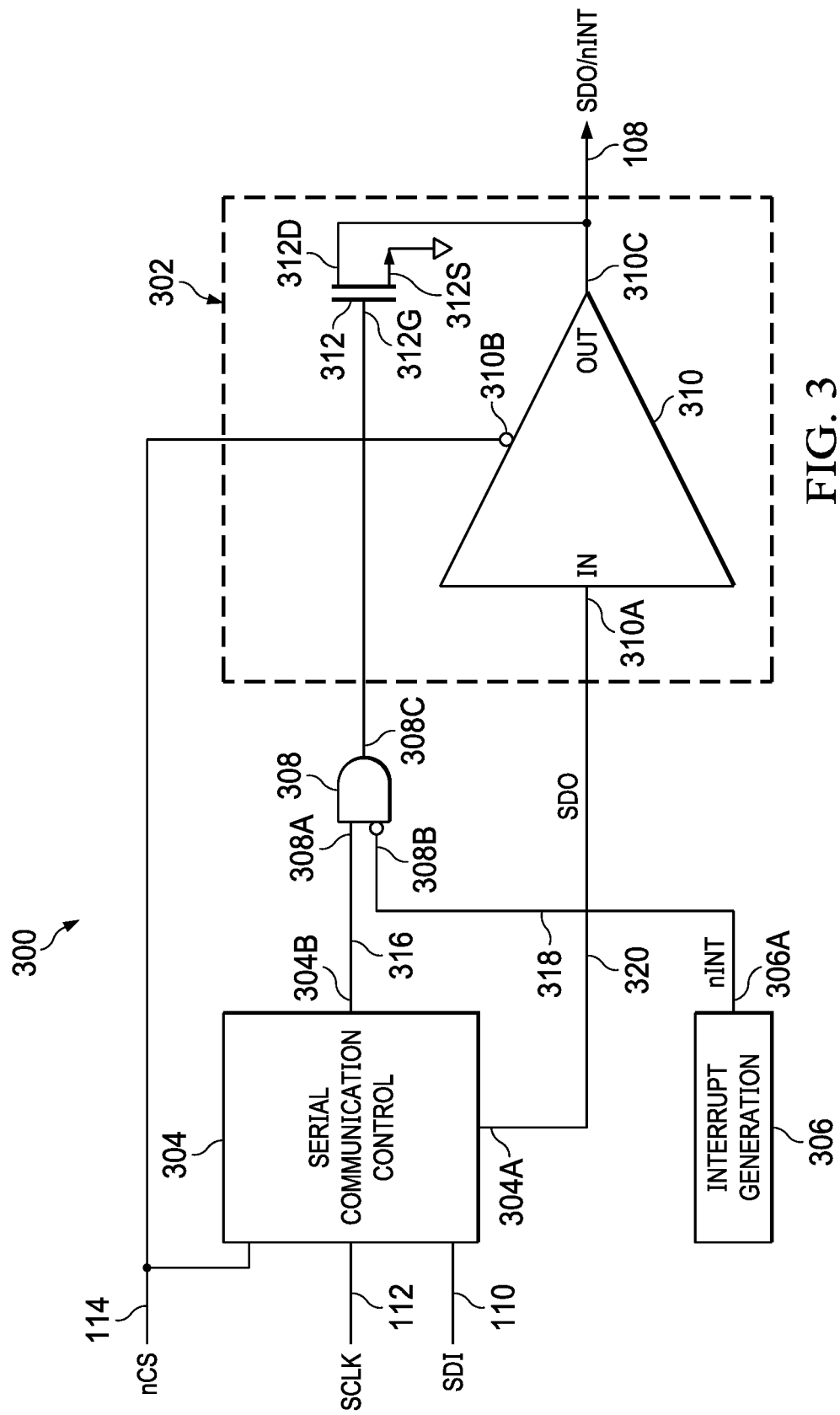
FIG. 3 shows a block diagram for another example integrated circuit that includes a combined interrupt and serial data output terminal in accordance with the present disclosure.

FIG. 3 shows a block diagram for another example integrated circuit 300 that includes a combined interrupt and serial data output terminal in accordance with the present disclosure. The integrated circuit 300 is an implementation of the integrated circuit 102. The integrated circuit 300 includes an output circuit 302, a serial communication control circuit 304, an interrupt generation circuit 306, and an interrupt enable circuit 308. The output circuit 302 is coupled to the combined serial data output and interrupt output terminal 108. The serial communication control circuit 304 is coupled to the serial data input terminal 110, the serial clock input terminal 112, and serial communication select input terminal 114 and controls transfer of serial data into and out of the integrated circuit 300. More specifically, the serial communication control circuit 304 generates serial output data 320 that is provided to the combined serial data output and interrupt output terminal 108. The serial communication control circuit 304 also generates a transaction envelope signal 316 that defines the time during which no serial data transfer is active. That is, the transaction envelope signal 316 defines the time during which an interrupt signal 318 is driven to the combined serial data output and interrupt output terminal 108. The interrupt generation circuit 306 generates the interrupt signal 318 that is provided to the combined serial data output and interrupt output terminal 108.

The output circuit 302 is coupled to the serial communication control circuit 304, the interrupt generation circuit 306, and the interrupt enable circuit 308. The output circuit 302 drives the interrupt signal 318 generated by the interrupt generation circuit 306 and the serial data 320 generated by the serial communication control circuit 304 to the combined serial data output and interrupt output terminal 108. The output circuit 202 includes a serial data input, an interrupt input, and a combined serial data and interrupt output. The serial data input is coupled to a serial data output 304A the serial communication control circuit 204. The interrupt input is coupled to an interrupt output 306A of the interrupt generation circuit 306 via the interrupt enable circuit 308. The combined serial data and interrupt output is coupled to the combined serial data output and interrupt output terminal 108.

The interrupt enable circuit 308 includes an input 308A, an input 308B, and an output 308C. The interrupt enable circuit 308 controls routing of the interrupt signal 318 generated by the interrupt generation circuit 306 to the combined serial data output and interrupt output terminal 108 based on the transaction envelope signal 316 generated by the serial communication control circuit 304. For example, an implementation of the interrupt enable circuit 308 activates a signal to drive the interrupt signal 318 generated by the interrupt generation circuit 306 to the combined serial data output and interrupt output terminal 108 if the transaction envelop signal 316 is inactive and the interrupt signal 318 is active, otherwise no interrupt signal is driven to the combined serial data output and interrupt output terminal 108. The input 308A of the interrupt enable circuit 308 is coupled to the output 304B of the serial communication control circuit 304. The input 308B of the interrupt enable circuit 308 is coupled to the output 306A of the interrupt generation circuit 306.

The output circuit 302 includes a driver circuit 310, and a transistor 312. The driver circuit 310 drives only the serial output signal to the combined serial data output and interrupt output terminal 108, and includes an output 310C coupled to the combined serial data output and interrupt output terminal 108, a data input 310A, and an enable input 310B. The data input 310A of the driver circuit 210 is coupled to the output 304A of the serial communication control circuit 304. The enable input 310B of the driver circuit 310 is coupled to the serial communication select input terminal 114. The driver circuit 310 drives the serial output signal generated by the serial communication control circuit 304 to the combined serial data output and interrupt output terminal 108 if the chip select signal received at the serial communication select input terminal 114 is active.

The transistor 312 drives the interrupt signal 318 generated by the interrupt generation circuit 306 to the combined serial data output and interrupt output terminal 108. The transistor 312 includes a terminal 312G, a terminal 312D, and a terminal 312S. The terminal 312S of the transistor 312 is coupled to ground. The terminal 312G of the transistor 312 is coupled to the output 308C of the interrupt enable circuit 308. The terminal 312D of the transistor 312 is coupled to the combined serial data output and interrupt output terminal 108 (i.e., coupled to the output 310C of the driver circuit 310). When the enable signal generated by the interrupt enable circuit 308 is active, the transistor 312 pulls the combined serial data output and interrupt output terminal 108 to ground, thereby driving the interrupt signal 318 generated by the interrupt generation circuit 306 to the combined serial data output and interrupt output terminal 108.

Figure 4:
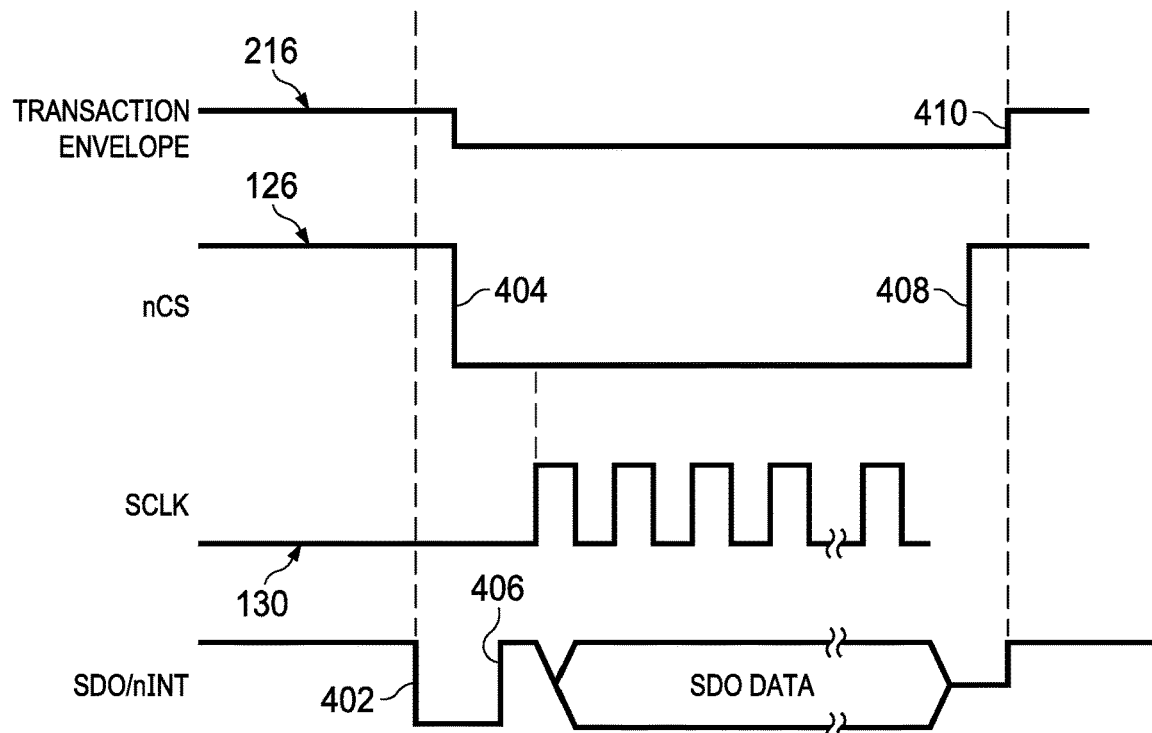
FIG. 4 shows an example timing diagram for operation of an integrated circuit that includes a combined interrupt and serial data output terminal in accordance with the present disclosure.

FIG. 4 shows an example timing diagram for operation of an integrated circuit that includes a combined interrupt and serial data output terminal in accordance with the present disclosure. At time 402, no serial data transaction is active. Consequently, the chip select signal 126 received at the serial communication select input terminal 114 is inactive, and the transaction envelope signal 216 generated by the serial communication control circuit 204 is inactive. The interrupt generation circuit 206 activates the interrupt output signal 218, and the interrupt output signal 218 is driven to the combined serial data output and interrupt output terminal 108. That is, the serial data output and interrupt signal 128 is activated to provide an interrupt to the integrated circuit 104.

The integrated circuit 104 recognizes the interrupt, and, at time 404, activates the chip select signal 126 to initiate serial communication with the integrated circuit 102. The serial communication control circuit 204 activates the transaction envelope signal 216 responsive to receipt of the chip select signal 126, and the drive of the interrupt output signal 218 to the combined serial data output and interrupt output terminal 108 is discontinued at time 406.

The integrated circuit 102 generates the serial clock signal 130 to time the transfer of serial data to/from the integrated circuit 102. For example, in the transaction framed by the chip select signal 126, the serial clock signal 130 clocks a data value into the integrated circuit 104 that causes the interrupt generation circuit 206 to deactivate the interrupt output signal 218, and/or retrieves a data value from the integrated circuit 102 that identifies a service requested by the interrupt.

At time 408, the serial data transfer is complete, and the integrated circuit 102 deactivates the chip select signal 126. On deactivation of the chip select signal 126, the output of the output circuit 202 is in a high impedance state and the combined serial data output and interrupt output terminal 108 is pulled up by the pull-up resistor 106. At time 410, the transaction envelope signal 216 is deactivated to enable generation of additional interrupts at the combined serial data output and interrupt output terminal 108 responsive to further activations of the interrupt output signal 218 by the interrupt generation circuit 206. The transaction envelope signal 216 remains active for time (e.g., 4 microseconds or more) after the deactivation of the chip select signal 126 to prevent presentation of an interrupt to the integrated circuit 102 for a time after deactivation of the chip select signal 126.

In implementations of the electronic system 100 that include multiple serial bus slave devices (e.g., multiple SPI slave devices) coupled to the integrated circuit 104, the integrated circuit 104 may disable interrupt generation in the 102 whenever communicating with any of the slave devices to prevent conflicts on the serial bus. For example, if the integrated circuit 104 desires to perform a serial bus transaction with a given integrated circuit other than the integrated circuit 102, then the integrated circuit 104 first performs a serial transaction with the integrated circuit 102 that disables interrupt generation in the integrated circuit 102. After communication with the given integrated circuit is complete, the integrated circuit 104 performs a serial transaction with the integrated circuit 102 that enables interrupt generation in the integrated circuit 102.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic system, comprising:
a first integrated circuit, comprising:
    a serial data input terminal; and
    an interrupt input terminal; and
a second integrated circuit comprising:
    a combined serial data output and interrupt output terminal coupled to the serial data input terminal of the first integrated circuit and the interrupt input terminal of the first integrated circuit;
    a serial communication control circuit;
    an interrupt generation circuit; and
    an output circuit comprising:
        a serial data input coupled to a serial data output of the serial communication circuit;
        an interrupt input coupled to an interrupt output of the interrupt generation circuit; and
a combined serial data and interrupt output coupled to the combined serial data output and interrupt output terminal;
wherein:
    the first integrated circuit comprises a chip select output terminal;
    the second integrated circuit comprises:
        a serial communication select input terminal coupled to the serial communication select output terminal of the first integrated circuit; and
        an interrupt enable circuit comprising:
            a first input coupled to a transaction envelope output of the serial communication control circuit;
            a second input coupled to the interrupt output of the interrupt generation circuit; and
            an output coupled to the output circuit.

2. The electronic system of claim 1, wherein the output circuit comprises: a driver circuit comprising an output coupled to the combined serial data output and interrupt output terminal; and
    a selector circuit comprising:
        a first input coupled to the serial data output of the serial communication circuit;
        a second input coupled to the interrupt output of the interrupt generation circuit;
        a third input coupled to the serial communication select input terminal; and an output coupled to a data input of the driver circuit.

3. The electronic circuit of claim 1, wherein the output circuit comprises:
    a driver circuit comprising an output coupled to the combined serial data output and interrupt output terminal; and
    a selector circuit comprising:
        a first input coupled to the output of the interrupt enable circuit;
        a second input coupled to a logic "one" voltage source;
        a third input coupled to the serial communication select input terminal; and
        an output coupled to an enable input of the driver circuit.

4. The electronic system of claim 1, wherein the output circuit comprises a driver circuit comprising:
    an output coupled to the combined serial data output and interrupt output terminal;

a data input coupled to the serial data output of the serial communication circuit; and an enable input coupled to the serial communication select input terminal.

5. The electronic system of claim 4, wherein the output circuit comprises a transistor comprising:

a first terminal coupled to the output of the driver circuit;

a second terminal coupled to ground; and a third terminal coupled to the output of the interrupt enable circuit.

6. An integrated circuit, comprising:

a combined serial data output and interrupt output terminal;

a serial communication control circuit;

an interrupt generation circuit; and an output circuit comprising:

a serial data input coupled to a serial data output of the serial communication circuit;

an interrupt input coupled to an interrupt output of the interrupt generation circuit; and a combined serial data and interrupt output coupled to the combined serial data output and interrupt output terminal; further comprising:

a serial communication select input terminal;

an interrupt enable circuit comprising:

a first input coupled to a transaction envelope output of the serial communication control circuit;

a second input coupled to the interrupt output of the interrupt generation circuit; and an output coupled to the output circuit.

7. The integrated circuit of claim 6, wherein the output circuit comprises:

a driver circuit comprising an output coupled to the combined serial data output and interrupt output terminal; and a selector circuit comprising:

a first input coupled to the serial data output of the serial communication circuit;

a second input coupled to the interrupt output of the interrupt generation circuit;

a third input coupled to the serial communication select input terminal; and an output coupled to a data input of the driver circuit.

8. The integrated circuit of claim 6, wherein the output circuit comprises:

a driver circuit comprising an output coupled to the combined serial data output and interrupt output terminal; and a selector circuit comprising:

a first input coupled to the output of the interrupt enable circuit;

a second input coupled to a logic "one" voltage source;

a third input coupled to the serial communication select input terminal; and an output coupled to an enable input of the driver circuit.

9. The integrated circuit of claim 6, wherein the output circuit comprises a driver circuit comprising:

an output coupled to the combined serial data output and interrupt output terminal;

a data input coupled to the serial data output of the serial communication circuit; and an enable input coupled to the serial communication select input terminal.

10. The integrated circuit of claim 9, wherein the output circuit comprises a transistor comprising:

a first terminal coupled to the output of the driver circuit;

a second terminal coupled to ground; and a third terminal coupled to the output of the interrupt enable circuit.

11. An integrated circuit, comprising:

an output terminal configured to provide an interrupt output signal and a serial data output signal;

an input terminal configured to receive a select signal that requests serial communication with another integrated circuit;

a serial communication control circuit configured to generate the serial data output signal;

an interrupt generation circuit configured to generate the interrupt output signal; and an output circuit coupled to the output terminal, the serial communication control circuit, and the interrupt generation circuit; wherein the output circuit is configured to:

provide the serial data output signal to the output terminal responsive to the select signal being active; and provide the interrupt output signal to the to the output terminal responsive to the select signal being inactive.

further comprising an interrupt enable circuit coupled to the serial communication control circuit and the interrupt generation circuit, and configured to disable routing of the interrupt output signal to the output terminal based on a transaction envelope generated by the serial communication control circuit.

12. The integrated circuit of claim 11, wherein the serial communication control circuit is configured to:

activate the serial communication transaction envelope based on activation of the select signal; and maintain activation of the serial communication transaction envelope for a predetermined interval after deactivation of the select signal.

13. The integrated circuit of claim 11, wherein the output circuit comprises:

a driver circuit coupled to the output terminal; and a selector circuit coupled to the driver circuit, the serial communication control circuit, the interrupt enable circuit, and the input terminal; wherein the selector circuit is configured to enable the driver circuit to drive the output terminal based on the select signal and an output of the interrupt enable circuit.

* * * * *